(12) United States Patent
Hebert et al.

(10) Patent No.: US 8,051,936 B1
(45) Date of Patent: Nov. 8, 2011

(54) HUMAN-PORTABLE REMOTE CONTROL DRIVING SYSTEM

(75) Inventors: James L. Hebert, Waldorf, MD (US); Wallace Louie, King George, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 818 days.

(21) Appl. No.: 12/214,293

(22) Filed: Jun. 12, 2008

Related U.S. Application Data

(63) Continuation-in-part of application No. 11/518,735, filed on Aug. 30, 2006, now Pat. No. 7,628,239.

(51) Int. Cl.
 *B62D 1/24* (2006.01)
(52) U.S. Cl. .......................... 180/167; 701/2; 73/118.01
(58) Field of Classification Search .................. 180/167, 180/316, 320, 333; 73/118.01; 701/2, 36; 74/512
See application file for complete search history.

(56) References Cited

U.S. PATENT DOCUMENTS

| | | | | | |
|---|---|---|---|---|---|
| 2,602,348 | A | * | 7/1952 | Wilson | 74/484 R |
| 2,724,285 | A | * | 11/1955 | Lerman | 74/481 |
| 2,777,335 | A | * | 1/1957 | Engberg et al. | 74/481 |
| 2,805,585 | A | * | 9/1957 | Besserman | 74/625 |
| 2,826,089 | A | * | 3/1958 | Hammack | 74/484 R |
| 2,855,797 | A | * | 10/1958 | Dunn, Jr. | 74/484 R |
| 2,875,638 | A | * | 3/1959 | Sell | 74/484 R |
| 2,928,291 | A | * | 3/1960 | Wilkerson | 74/494 |
| 3,003,363 | A | * | 10/1961 | De Hart | 74/494 |
| 3,226,997 | A | * | 1/1966 | Malloy | 74/482 |
| 3,465,577 | A | * | 9/1969 | Donovan | 73/118.01 |
| 3,648,539 | A | * | 3/1972 | Rouis | 74/494 |
| 3,662,593 | A | * | 5/1972 | Pirrello et al. | 73/132 |
| 3,713,332 | A | * | 1/1973 | Herrbrich | 73/118.01 |

(Continued)

OTHER PUBLICATIONS

Kairos Autonomia home page http:www.kairosautonomi.com/.

(Continued)

*Primary Examiner* — J. Allen Shriver, II
*Assistant Examiner* — Jacob Meyer
(74) *Attorney, Agent, or Firm* — Gerhard W. Thielman, Esq.

(57) ABSTRACT

A human-portable modular system is provided for remotely controlling an automotive vehicle by an operator physically unconnected thereto. For a typical vehicle, the system includes a radio control transmitter that sends command signals from the operator, a pedal control assembly, a steering control assembly, an electronics case disposable on the driver's seat, coupling mechanisms that respectively connect said assemblies to the electronics case, and a package for stowing and transporting the transmitter, the electronics case, and the assemblies. The pedal control assembly includes a linkage arm, an actuator pivotably connected to the linkage arm at its proximate end, and first and second arms pivotably connected to the linkage arm to controllably push the respective control pedals for acceleration and braking. The steering control assembly includes a motor that provides torque, and an attachment that couples the motor to the vehicle's steering wheel. The electronics case includes a receiver that receives the command signals from the transmitter, a controller that communicates the command signals to the motor and the actuator, and a portable power supply to provide electrical power to the controller and to the receiver. The package can include shoulder straps to facilitate backpack transport. The coupling mechanisms include detachable hinge connectors to pivotably attach the pedal control and steering control assemblies to the electronics case. The pedal control assembly can further include near the linkage arm's distal end a linkage arm feedback potentiometer that sends an angular position indicator signal to the controller.

10 Claims, 4 Drawing Sheets

U.S. PATENT DOCUMENTS

| | | | | |
|---|---|---|---|---|
| 3,762,239 | A | * | 10/1973 | Rouis .................... 74/494 |
| 3,877,318 | A | * | 4/1975 | Castoe .................... 74/481 |
| 3,895,545 | A | * | 7/1975 | Hunter .................... 74/494 |
| 4,324,309 | A | | 4/1982 | Ginley .................... 180/316 |
| 4,427,229 | A | * | 1/1984 | Johnson .................... 296/180.4 |
| 4,438,835 | A | * | 3/1984 | Dowden et al. .................... 477/193 |
| 4,453,485 | A | * | 6/1984 | Houghton-Brown et al. .................... 114/144 A |
| 4,463,821 | A | * | 8/1984 | Falamak .................... 180/168 |
| 4,476,954 | A | * | 10/1984 | Johnson et al. .................... 180/333 |
| 4,627,522 | A | * | 12/1986 | Ulrich et al. .................... 192/35 |
| 4,657,463 | A | * | 4/1987 | Pipes .................... 414/495 |
| 4,742,720 | A | * | 5/1988 | Storck .................... 73/865.9 |
| 4,788,879 | A | * | 12/1988 | Ulrich .................... 74/481 |
| 4,946,013 | A | * | 8/1990 | Conlyn et al. .................... 477/209 |
| 5,012,689 | A | * | 5/1991 | Smith .................... 74/89.17 |
| 5,121,651 | A | * | 6/1992 | Bristow .................... 74/481 |
| 5,172,589 | A | * | 12/1992 | Witt .................... 73/132 |
| 5,270,628 | A | * | 12/1993 | Noguchi et al. .................... 318/587 |
| 5,318,143 | A | * | 6/1994 | Parker et al. .................... 180/168 |
| 5,363,027 | A | * | 11/1994 | Noguchi .................... 318/573 |
| 5,372,035 | A | * | 12/1994 | Ogawa et al. .................... 73/118.01 |
| 5,394,743 | A | * | 3/1995 | Noguchi et al. .................... 73/118.01 |
| 5,415,034 | A | * | 5/1995 | Nishikawa et al. .................... 73/118.01 |
| 5,442,553 | A | * | 8/1995 | Parrillo .................... 455/420 |
| 5,542,312 | A | * | 8/1996 | Peters .................... 74/481 |
| 5,602,450 | A | * | 2/1997 | Cowan et al. .................... 318/265 |
| 5,615,581 | A | * | 4/1997 | Cordioli .................... 74/494 |
| 5,821,718 | A | * | 10/1998 | Shaffer et al. .................... 318/587 |
| 5,835,867 | A | * | 11/1998 | Froelich et al. .................... 701/2 |
| 5,865,266 | A | * | 2/1999 | Froelich et al. .................... 180/443 |
| 5,908,454 | A | * | 6/1999 | Zyburt et al. .................... 701/24 |
| 5,913,945 | A | * | 6/1999 | Froelich et al. .................... 74/512 |
| 5,991,674 | A | * | 11/1999 | Froelich et al. .................... 701/36 |
| 5,994,853 | A | | 11/1999 | Ribbe .................... 318/16 |
| 6,061,613 | A | * | 5/2000 | Zyburt et al. .................... 701/24 |
| 6,073,508 | A | * | 6/2000 | Vitous et al. .................... 74/335 |
| 6,108,031 | A | * | 8/2000 | King et al. .................... 348/118 |
| 6,112,608 | A | * | 9/2000 | Spravsow et al. .................... 74/335 |
| 6,113,459 | A | * | 9/2000 | Nammoto .................... 446/454 |
| 6,141,603 | A | * | 10/2000 | Greenhill .................... 700/245 |
| 6,141,620 | A | * | 10/2000 | Zyburt et al. .................... 701/117 |
| 6,259,980 | B1 | * | 7/2001 | Peck et al. .................... 701/24 |
| 6,283,220 | B1 | | 9/2001 | Carter .................... 169/24 |
| 6,640,164 | B1 | * | 10/2003 | Farwell et al. .................... 701/2 |
| 6,695,688 | B1 | * | 2/2004 | Owen et al. .................... 452/187 |
| 6,893,320 | B2 | | 5/2005 | Caiozza .................... 446/456 |
| 7,360,623 | B2 | * | 4/2008 | Green et al. .................... 180/443 |
| 7,528,835 | B2 | * | 5/2009 | Templeman .................... 345/474 |
| 7,540,826 | B2 | * | 6/2009 | Ochiai .................... 477/211 |
| 7,628,239 | B1 | * | 12/2009 | Louie et al. .................... 180/167 |
| 7,708,330 | B2 | * | 5/2010 | Staehle .................... 296/65.13 |
| 7,731,588 | B2 | * | 6/2010 | Templeman .................... 463/38 |
| 7,894,951 | B2 | * | 2/2011 | Norris et al. .................... 701/36 |
| 2002/0165648 | A1 | * | 11/2002 | Zeitler .................... 701/23 |
| 2006/0011397 | A1 | | 1/2006 | Huang et al. .................... 180/167 |
| 2006/0254839 | A1 | * | 11/2006 | Hasty et al. .................... 180/167 |
| 2008/0071429 | A1 | * | 3/2008 | Kraimer et al. .................... 701/2 |
| 2008/0269015 | A1 | * | 10/2008 | Ochiai .................... 477/209 |

OTHER PUBLICATIONS

Universal Unmanned Vehicle Retrofit Kit http://www.kairosautonomi.com/pronto4_kit.htm.

Pronto4™ Fact Sheet http://www.kairosautonomi.com/downloads/Pronto4_fact_sheet.pdf.

U.S. Appl. No. 11/518,735, filed Aug. 30, 2006, Louie et al.

* cited by examiner

HUMAN-PORTABLE REMOTE CONTROL DRIVING SYSTEM

CROSS REFERENCE TO RELATED APPLICATION

The invention is a Continuation-in-Part, claims priority to and incorporates by reference in its entirety U.S. patent application Ser. No. 11/518,735 filed Aug. 30, 2006 titled "Adaptable Remote Control Driving System" to Wallace Louie and James L. Hebert and assigned Navy Case 97889.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to remote control systems for automobiles. In particular, the system includes a human-portable kit of linkage components that can be adjustably and non-destructively installed for a variety of vehicles and subsequently disassembled for storage in minimal time. The system responds to control signals transmitted via a radio-remote-control device.

Test safety demands on occasion require remote control of a road-mobile ground-transportation vehicle, such as that simulated by the time-traveling Delorean sportscar featured in Back to the Future. Such implements have typically been custom fitted to the controls subsequent to or currently with modification of the driver's position equipment, such as seat, bench or steering wheel.

SUMMARY

Conventional remote control systems yield disadvantages addressed by various exemplary embodiments of the present invention. In particular, various exemplary embodiments provide a human-portable modular system for remotely controlling an automotive vehicle by an operator physically unconnected thereto. For a typical vehicle, the system includes a radio control transmitter that sends command signals from the operator to drive the vehicle, a pedal control assembly, a steering control assembly, an electronics case disposable on the driver's seat, coupling mechanisms that respectively connect said assemblies to the electronics case, and a package for stowing and transporting the transmitter, the electronics case, and the assemblies.

The pedal control assembly includes a linkage arm, an actuator pivotably connected to the linkage arm at its proximate end, and first and second arms pivotably connected to the linkage arm to controllably push the respective control pedals for acceleration and braking. The steering control assembly includes a motor that provides torque, and an attachment that couples the motor to the vehicle's steering wheel. The electronics case includes a receiver that receives the command signals from the transmitter, a controller that communicates the command signals to the motor and the actuator, and a portable power supply to provide electrical power to the controller and to the receiver.

In various embodiments, the package can include shoulder straps to facilitate backpack transport. In alternate or additional embodiments, the coupling mechanisms include detachable hinge connectors to pivotably attach the pedal control and steering control assemblies to the electronics case. Additionally and/or alternatively, the pedal control assembly can further include near the linkage arm's distal end a linkage arm feedback potentiometer that sends an angular position indicator signal to the controller.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

Figure 1:
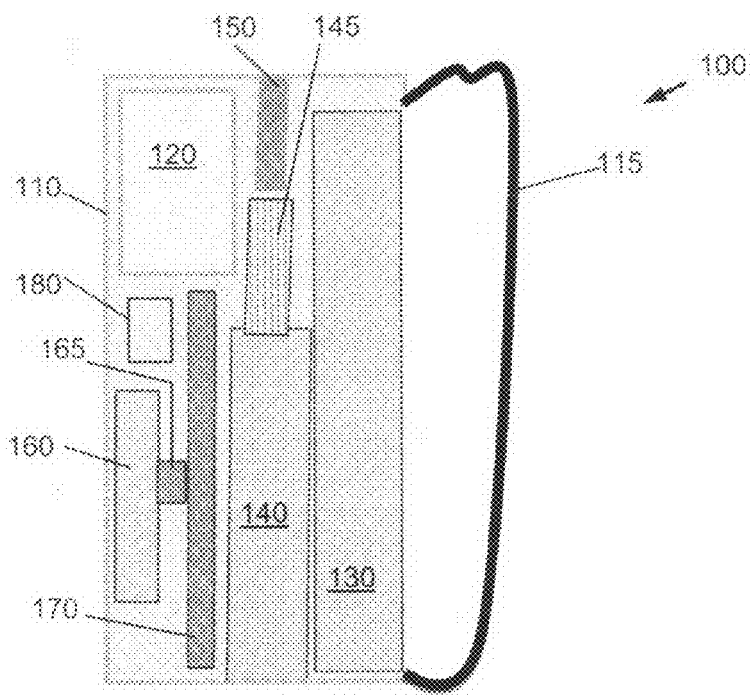
FIG. 1 is an elevation view of a human-portable remote control drive system as containerized for stowage.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Operating a motor vehicle typically requires a human driver to control direction and speed along a road or other path. Select circumstances that present catastrophic hazards to personnel and/or equipment may preclude such an option. Such operations may include test conditions, such as crash-evaluation and/or radiation exposure, or battlefield conditions, such as on patrol for landmines. Remote control of the vehicle from a standoff position presents a solution to avoid dangerous risk to human personnel.

For military operations in hostile environments, armed service personnel may commandeer a vehicle for remote operations without necessitating permanent modifications to the vehicle. Conventional methods of installing remote driving equipment require physical modification to the vehicles and are not readily transferable from one vehicle to another. U.S. patent application Ser. No. 11/518,735, incorporated entirely by reference, describes a related system that can be installed for remote vehicle operation and subsequently disassembled. That system is appropriate for remotely driving vehicles during research and development testing under hazardous conditions.

That and earlier systems could not easily be carried by one person. Also, conventional systems do not facilitate expeditious installation into virtually any vehicle. Various embodiments provide a modular human-portable system that upon installation provides remote vehicle control for virtually any conventional four-plus-wheel vehicle that incorporates automatic transmission.

In regions far from supply depots, the equipment necessary to perform such tasks may preferably be human-portable, such as in a back-pack. This back-pack version can be used to remotely operate virtually any vehicle via radio control with a system that is totally self-contained therein. Optimally, such equipment should be modular and rugged to facilitate transport under severe vibration, shock, inclement weather and large temperature variations. Also, preferably, such equipment should be installable by a single operator. The system would be environmentally sealed to resist damage from dust, debris, rain, water, or temporary submersion in water.

Upon installation, the operator starts the vehicle manually and shifts the gear setting to 'drive' prior to being remotely driven by the radio controller. In order to provide operational capability in desolate regions on the globe, at least one direct-current (DC) battery supplies the electrical power, which limits the operational run-time depending upon system load and usage. Thus, significant steering and braking to avoid obstacles may reduce total operation duration as compared to cruising at constant-speed in a straight-line.

FIG. 1 shows an elevation view 100 of the human-portable remote control drive system (RDS) as containerized for stowage. The RDS components are packed in a container 110, which may incorporate light-weight weather-proofing and structural reinforcement as necessary. The container 110 may be attachable on one side by shoulder straps 115, enabling the container 110 to be carried on (i.e., cantilever suspended from) a person's back. Alternatively, the container 110 may incorporate a handle (not shown) for gripping and/or castor wheels (not shown) for rolling along a road surface.

Within the container 110 may be contained a radio control transmitter 120, a battery-and-electronics case-130, an actuator linkage 140, segmented actuator arms 145, 150, a steering drive motor 160, a connection hub 165, steering brackets 170 and optionally a remote sensor 180, such as a miniature video camera. The transmitter 120 may represent a commercial off-the-shelf (COTS) standard Futaba 9-channel transmitter-controller-and-receiver operating on 75 MHz. This can easily be replaced with a system that operates on 2.4 GHz (or any tactically used frequency) with Digital Spread Spectrum (DSS) if required operationally.

Figure 2:
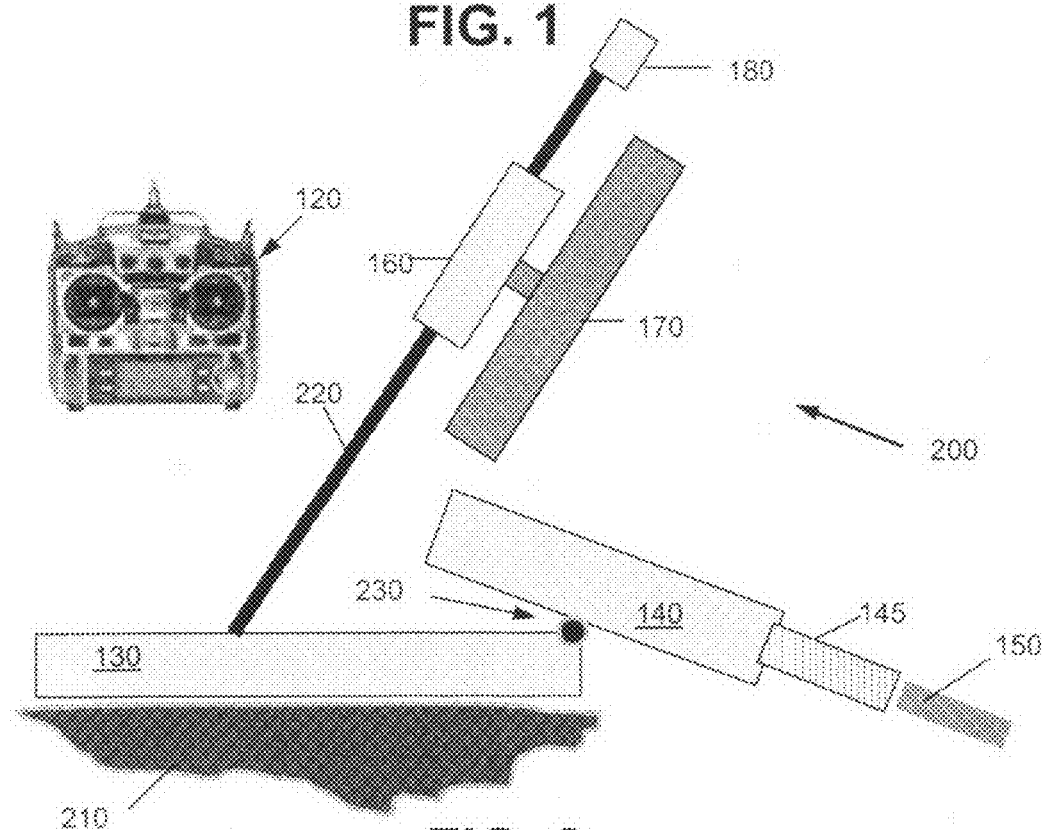
FIG. 2 is an elevation view of the human-portable remote control drive system unpacked.

FIG. 2 shows an elevation view 200 of the human-portable remote control drive system as unpacked and installed, including the transmitter 120, separate from the other components. The battery-and-electronics case 130 is disposed onto a driver's seat 210, with the linkage 140 oriented towards the foot pedals. The steering brackets 170 may be connected to a steering wheel, to be turned by the motor 160. A collapsible steering support bracket 220 provides pivotable support for the motor 160 and optionally terminates with the sensor 180. A slidable hinge 230 connects the actuator link 140 to the case 130. When stowed, the bracket 220 can be separately stored within the back-pack container 110. Upon installation, the bracket 220 can be connected to a hinge mechanism to the case 130. The sensor 180 disposed on or near the distal end of the bracket 220 from the case 130 sends driver-related signals to the operator, such as video imagery and/or navigational positioning information.

Figure 3:
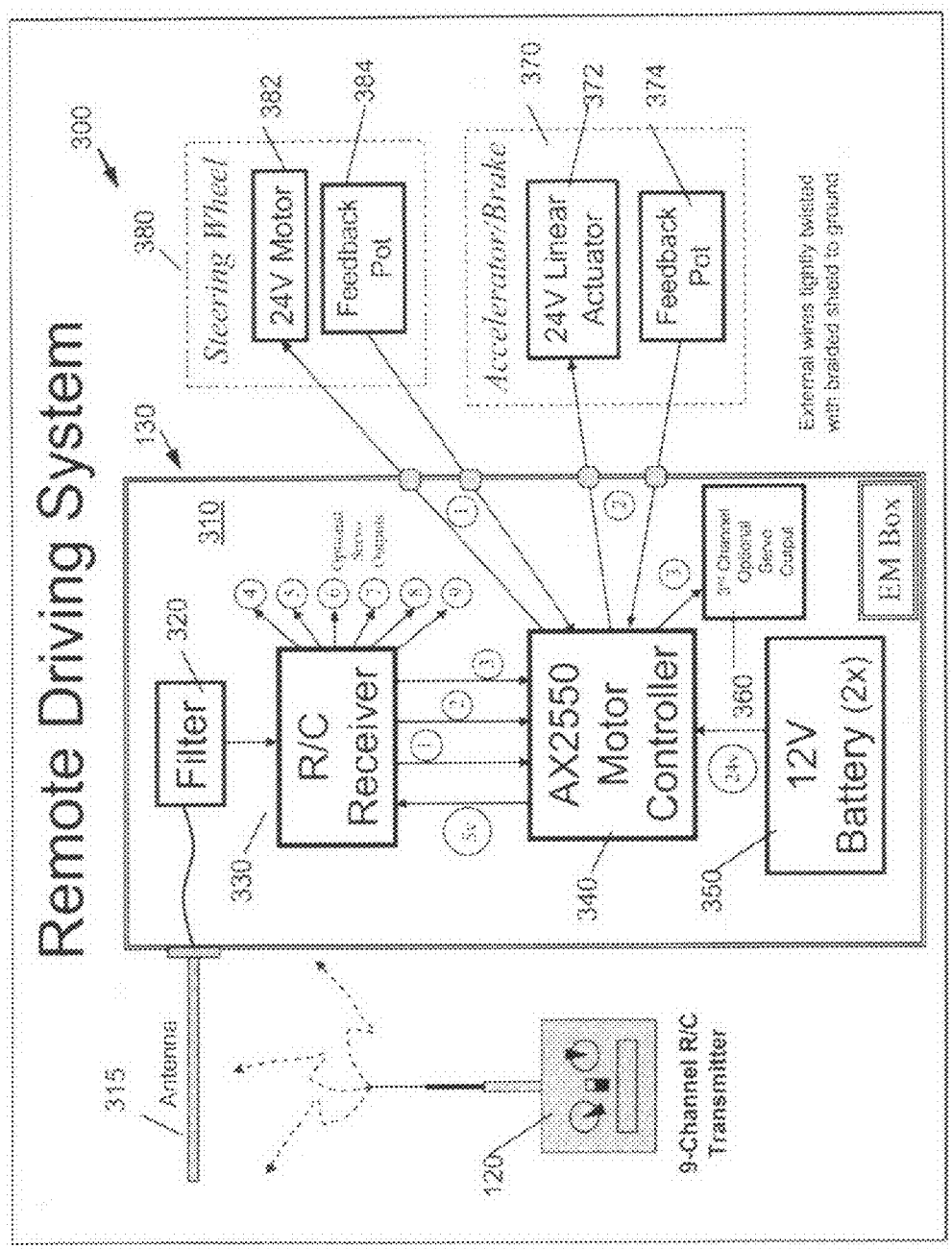
FIG. 3 is a block diagram schematic of a receiver and control subsystem.

FIG. 3 shows a block diagram schematic 300 of a receiver and control subsystem 310 for the remote control drive system. The battery-and-electronics case 130 contains the subsystem 310. An antenna 315 extends from the case 130 and connects to an electromagnetic filter 320 therein. The 9-channel radio control transmitter 120 sends signals to the antenna 315. The filter 320 connects to a radio control receiver 330 having optional servo outputs.

A motor controller 340, such as an AX2550, receives instruction signals. A pair of 12-volt batteries 350 provides 24 volts DC power to the controller 340. Either the motor controller 340 or one of the batteries 350 submits 5 volts DC power to the receiver 330. An optional third channel optional servo output 360 receives signals from the controller 340. An accelerator/brake pedal subsystem 370, with a 24-volt linear actuator 372 and a feedback potentiometer (pot) 374, is external to the case 130. A steering subsystem 380, with a 24-volt motor 382 and a feedback pot 384, is also external to the case 130. Wires connecting the controller 340 to the pedal and steering subsystems 370, 380 may be tightly twisted with braided shield to fixed potential known as ground.

Figure 4:
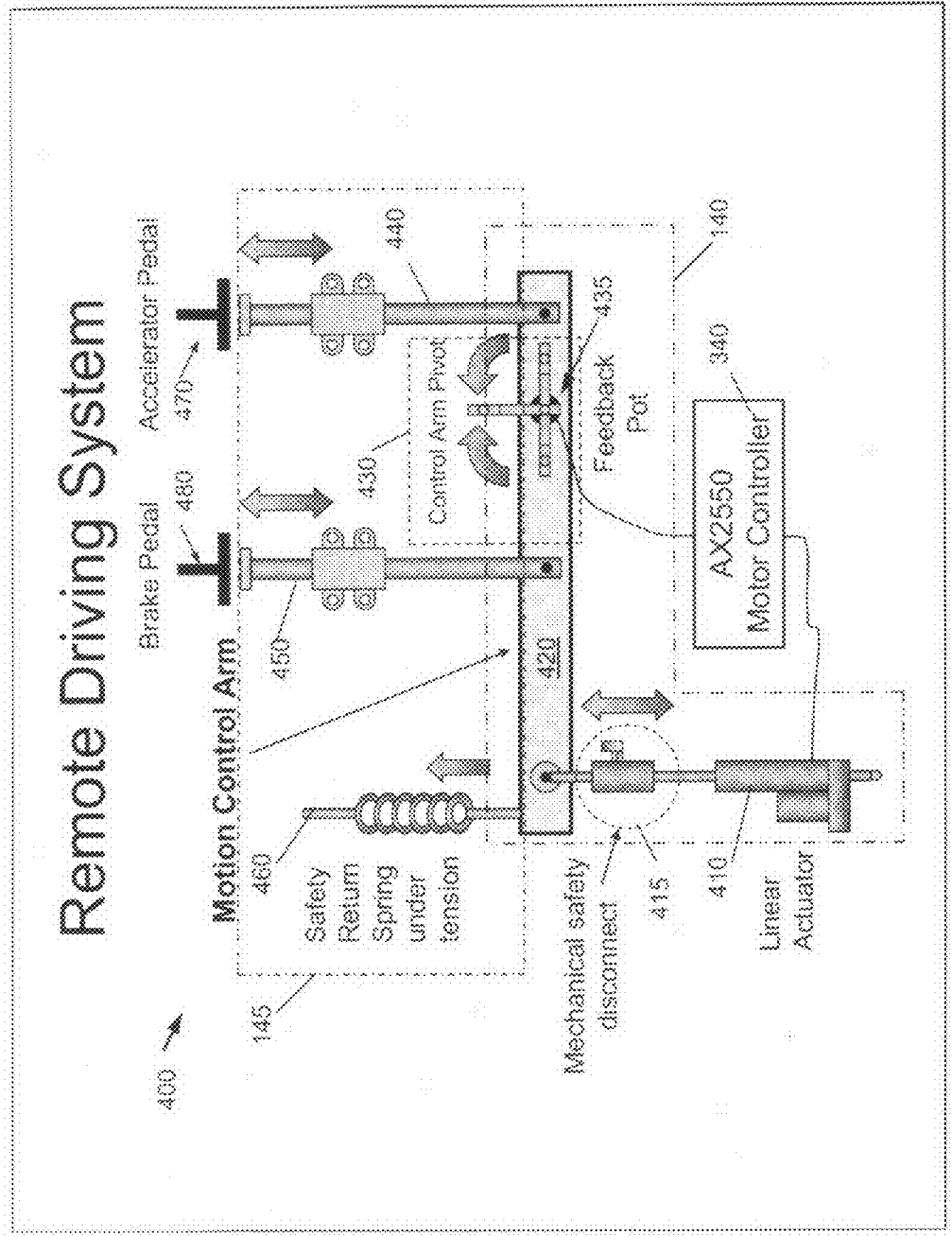
FIG. 4 is a block diagram schematic of a foot-pedal actuator subsystem.

FIG. 4 shows a block diagram schematic 400 of a foot-pedal actuator linkage 140 for the remote control drive system. The actuator linkage 140 operates the accelerator/brake pedal subsystem 370. The linkage 140 includes a linear actuator 410 that optionally includes a mechanical safety disconnect 415, a motion control linkage arm 420, and an optional control arm pivot 430 connected to an optional feedback pot 435 (corresponding to the pot 374 in FIG. 3). The linear actuator 410 receives signals from the motor controller 340, which optionally receives response signals from the feedback pot 435.

The disconnect 415 physically separates the actuator 410 and the motion control arm 420 under defined circumstances, such as under acceleration levels beyond an established threshold. The disconnect 415 includes a pair of components that axially combine to form a cylinder held by a releasable pin, as described more fully in paragraph [0048] of the '735 co-pending Application.

The actuator 410 expands and contracts to translate linearly, thereby pivotably deflecting the arm 420. The pivot 430 rotates clockwise or counterclockwise depending on the acceleration or braking control being commanded. The motor controller 340 provides control signals to the actuator 410 and the pot 435. The actuator arms 145 include an accelerator arm 440, a brake arm 450 and a safety return spring 460. The arms 440, 450 are pivotably attached to the linkage arm 420. The arms 440, 450 respectively engage accelerator and brake pedals 470, 480 of the vehicle. The spring 460 provides tension to pull the arm 420 away from the actuator 410 upon release of the disconnect 415.

The arms 440, 450 may be encased in a weather proof enclosure with the insides that have the embodied design as illustrated below. This enclosure can be secured by the slidable hinge 230 to the battery and electronics case 130 that provides the stability and pack pressure needed to actuate the pedals. The arms 440, 450 that extend down to the respective accelerator and brake pedals 470, 480 are length-wise adjustable to fit sundry vehicles. The tilt angle to the pedals can be adjustably set at the hinge 230 relative to the case 130. The pedals may be connected with plastic tie wraps (or industrial Velcro®) to the actuator arms 440, 450 and no modifications are necessary to either pedal 470, 480 for releasable detachment of the arms 440, 450.

Figure 5:
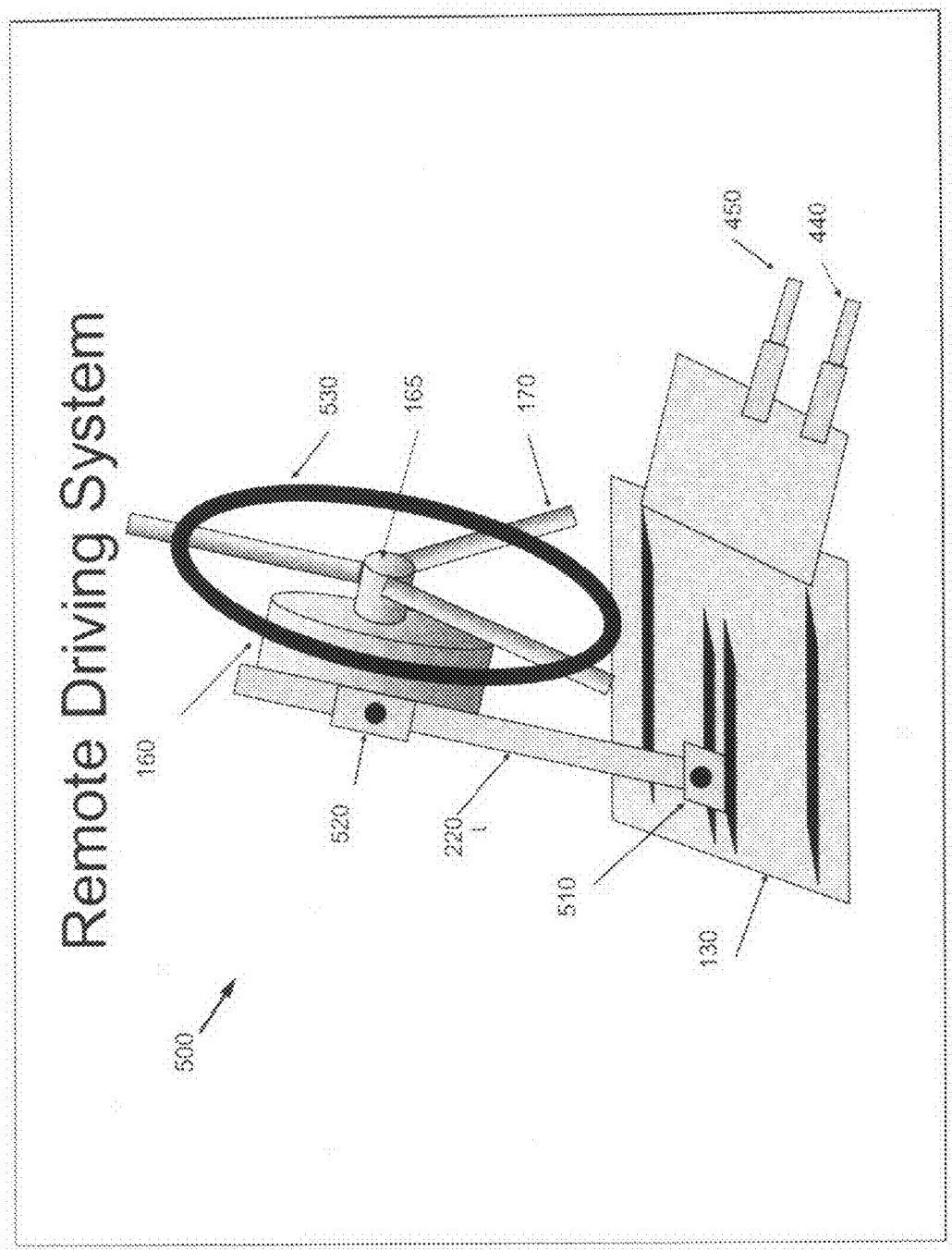
FIG. 5 is an isometric view of a steering control subsystem.

FIG. 5 shows an isometric view 500 of a steering control subsystem 380. A joint 510 connects the bracket 220 with the case 130 in a manner to enable the attachment to slide and pivot thereon. The bracket 220 also includes an adjustable attachment 520 to enable the low-profile geared steering drive motor 160 to be translated and secured thereon. The steering-wheel attachment brackets 170 connect the vehicle's steering wheel 530 the hub 165 that in turn attaches to the motor 160. Upon installation, the steering subsystem 380 can be disposed above the linkage 140 of the pedal subsystem 370.

The steering device attaches to the top of the case 130 to inhibit twisting while turning the steering wheel 530. The steering device may contain the direct drive motor 160 for turning the steering wheel 530. The adjustable arm brackets 170 (of which three are preferably shown) connect to the steering wheel 530, converging at the hub 165 and connect to the motor 160. Another optional feedback pot (corresponding to the pot 384 in FIG. 3) may be connected to the hub 165 to provide steering feedback signals to the controller 340.

This system provides the advantage of complete portability enabling the components to be packaged for being carried by one person on his back. The new concept for the steering wheel mechanism alleviates the need for a drive chain, as the prior application. The system may be self aligning, to thereby facilitate faster system installation.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A human-portable modular system for remotely controlling an automotive vehicle by an operator physically unconnected thereto, said vehicle having a steering device, respective control pedals for acceleration and braking and a driver seat, the system comprising:
   a radio control transmitter that sends command signals from the operator;
   a pedal control assembly, including:
      a linkage arm having proximate and distal ends,
      an actuator pivotably connected to said linkage arm at said proximate end, and
      first and second arms pivotably connected to said linkage arm to controllably push the respective control pedals for acceleration and braking;
   a steering control assembly, including:
      a motor that provides torque, and
      an attachment that couples said motor to the steering device;
   an electronics case disposable on the driver seat, said case including:
      a receiver that receives said command signals from said transmitter,
      a controller that communicates said command signals to said motor and said actuator, and
      a portable power supply to provide electrical power to said controller and to said receiver;
   coupling mechanisms that respectively connect said assemblies to said electronics case; and
   a package for stowing and transporting said transmitter, said electronics case, and said assemblies.

2. The system according to claim 1, wherein said package includes shoulder straps.

3. The system according to claim 1, wherein said pedal control assembly further includes a linkage arm feedback potentiometer that sends an angular position indicator signal to said controller, said potentiometer being disposed towards said distal end of said linkage arm.

4. The system according to claim 1, wherein said steering control assembly further includes a steering feedback potentiometer that sends an angular position indicator signal to said controller.

5. The system according to claim 1, wherein said pedal control assembly further includes a disconnector to mechanically separate said actuator from said linkage arm upon command.

6. The system according to claim 1, wherein said coupling mechanisms further comprise a slidable hinge to pivotably connect said pedal control assembly to said electronics case.

7. The system according to claim 1, wherein said coupling mechanisms further include a detachable support mount onto which said steering control assembly attaches for deployment and detaches for stowage, said mount having a proximal end that pivotably connects to said electronics case for deployment.

8. The system according to claim 7, further comprising an optical camera that transmits images to the operator, said camera being securable to said support mount.

9. The system according to claim 1, wherein said portable power supply further includes a direct-current battery.

10. The system according to claim 1, wherein said portable power supply provides electrical power to said receiver via said controller.

\* \* \* \* \*

UNITED STATES PATENT AND TRADEMARK OFFICE
CERTIFICATE OF CORRECTION

PATENT NO. : 8,051,936 B1  
APPLICATION NO. : 12/214293  
DATED : November 8, 2011  
INVENTOR(S) : James L. Hebert and Wallace Louie It is certified that error appears in the above-identified patent and that said Letters Patent is hereby corrected as shown below:

Front Cover INID Code (75) identifying the inventors:
        on line 2, please replace "King George, VA (US)" with --Fredericksburg, VA (US)--.

Signed and Sealed this  
Third Day of January, 2012

David J. Kappos  
*Director of the United States Patent and Trademark Office*